D. L. JACOBSON.
PROCESS FOR PURIFYING GASES.
APPLICATION FILED OCT. 22, 1920.
1,390,037.
Patented Sept. 6, 1921.
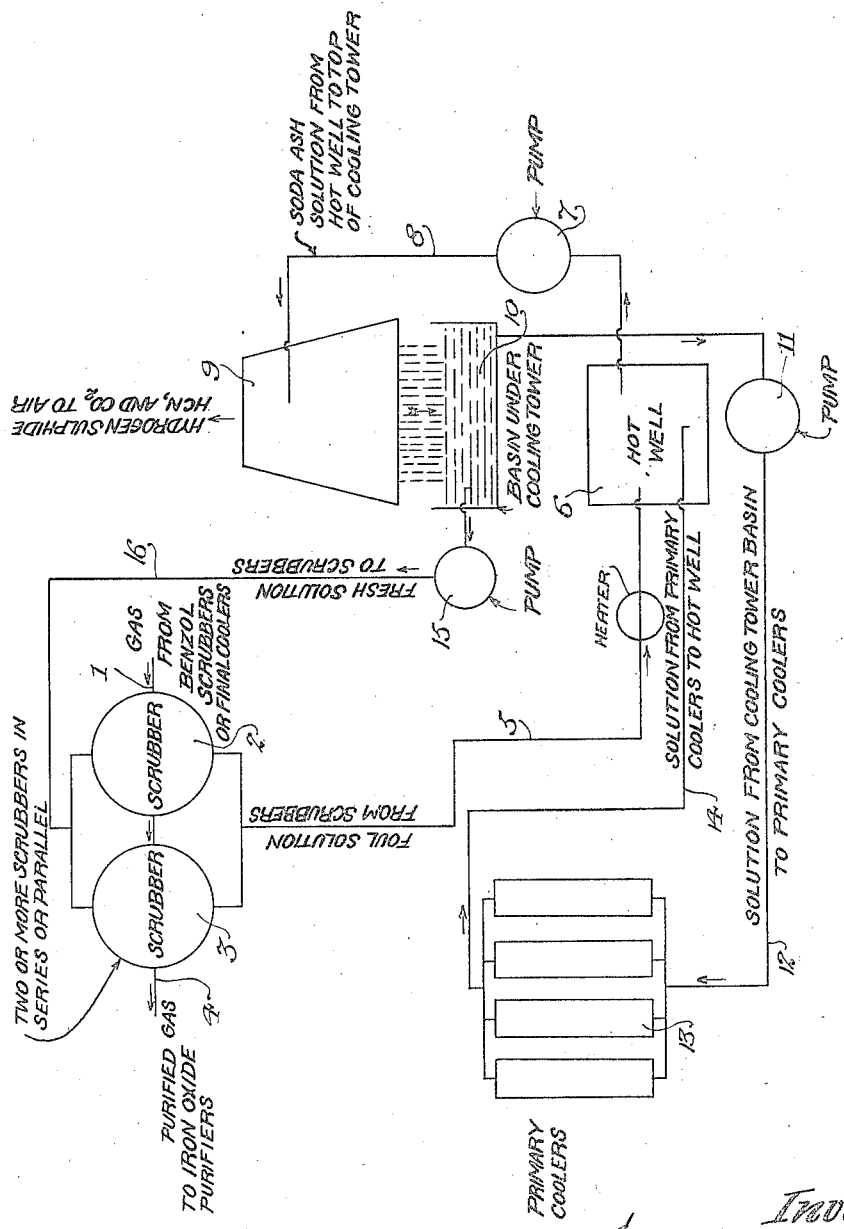

UNITED STATES PATENT OFFICE.

DAVID L. JACOBSON, OF JERSEY CITY, NEW JERSEY, ASSIGNOR TO THE KOPPERS COMPANY, OF PITTSBURGH, PENNSYLVANIA, A CORPORATION OF PENNSYLVANIA.

PROCESS FOR PURIFYING GASES.

1,390,037.                    Specification of Letters Patent.      Patented Sept. 6, 1921.

Application filed October 22, 1920. Serial No. 418,810.

*To all whom it may concern:*

Be it known that I, DAVID L. JACOBSON, a citizen of the United States, residing at Jersey City, in the county of Hudson and State of New Jersey, have invented a new and useful Improvement in Processes for Purifying Gases, of which the following is a specification.

This invention relates to the treatment of fuel gases, such for example as coke oven gas, and has for an object to effect an efficient purification of the gas, while it flows continuously, by an absorption and removal from the gas of noxious constituents such as sulfur compounds principally in the form of hydrogen sulfid. These sulfur componds become obnoxios especially when the gas is consumed and, to avoid this, it is a common practice to pass the gas through boxes containing quantities of iron oxid before allowing the gas to flow into the mains. The iron oxid functions to absorb these deleterious sulfur compounds from the gas but the iron oxid boxes have to be frequently cleaned and replenished and are consequently expensive to maintain. By the use of the present invention, the quantity of iron oxid necessary to insure purification of the gas is reduced to a minimum, inasmuch as the improved purification process removes substantially all of the sulfur compounds from the gas before the gas passes into any iron oxid boxes on its way to the mains.

A further object of the invention is to provide a complete regeneration of the gas purifying agent after such agent has absorbed the sulfur compounds from the gas by causing the purifying agent to give up its sulfur, thereby permitting a constant reflux of the purifying agent back to the gas purifying process, with a consequent reduction in the quantity of purifying agent needed for carrying out the process of absorption of sulfur from the gas, enabling the process to be carried out economically and without waste.

In addition to the general objects recited above, the invention has for further objects such other improvements or advantages in operation and results as are found to obtain in the apparatus and processes hereinafter described or claimed.

In the accompanying drawing, forming a part of this specification, and showing, for purposes of exemplification a preferred form and manner in which the invention may be embodied and practised, but without limiting the claimed invention specifically to such illustrated instance or instances, the figure illustrates a diagrammatic representation of apparatus for carrying out the improved gas purifying process of the present invention.

In its present embodiment, the invention is applied to the purification of coke oven gas, and, for convenience, the present description will be confined to this use of the invention. The features of the invention are, however, readily susceptible of other valuable applications and consequently the scope of the invention is by no means confined to the specific use and specific embodiment herein described as an illustrative example.

For effecting the absorption of the sulfur compounds from the gas, there is employed a water solution of an alkaline compound having an affinity for hydrogen sulfid. A number of the compounds of the alkali metals and alkaline earths possess this property. I have discovered, however, that a solution of sodium carbonate in water is especially suitable for effecting the absorption of sulfur from the gas, because of the great affinity which a water solution of sodium carbonate has for hydrogen sulfid and because of the cheapness and availability of this sodium salt. A solution of sodium carbonate is strongly basic in its properties. When sodium carbonate dissolved in water is brought into contact with gas, such as coke oven gas, containing carbon dioxid and hydrogen sulfid, carbon dioxid is absorbed, and sodium bicarbonate is formed, as may, for example, be illustrated by the following equation:

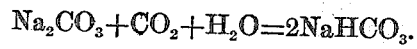

$$Na_2CO_3 + CO_2 + H_2O = 2NaHCO_3.$$

The solution of sodium carbonate will also effect the absorption of such sulfur compounds as hydrogen sulfid, $H_2S$, from the gas. The absorption of hydrogen sulfid by the sodium carbonate solution may be illustrated by the following equation:

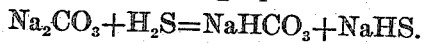

$$Na_2CO_3 + H_2S = NaHCO_3 + NaHS.$$

In applying the above to the absorption of sulfur from a gas, it is preferable to use a dilute solution of sodium carbonate in water.

A concentration from about two to about five percentum of sodium carbonate in the solution will be found satisfactory. The coke oven gas from the benzol scrubbers or from the final coolers is passed through a gas line 1 into a like scrubber 2 in which it passes up through a descending current of sodium carbonate solution to effect the absorption of the hydrogen sulfid from the gas. From the scrubber 2 the gas may be passed through a second scrubber 3 and again brought into contact with sodium carbonate solution. Passing out of the scrubber 3 the substantially purified gas flows through a gas line 4 to iron oxid boxes, which are employed for absolute safety. However, substantially the entire content of sulfur is absorbed from the gas in the scrubbers 2 and 3 and little, if any, sulfur remains in the gas as it passes through the iron oxid boxes. Consequently the quantity of iron oxid may be greatly reduced and the upkeep of the iron oxid boxes will involve but a small expense, as compared with present practice in which the entire quantity of sulfur is absorbed by the iron oxid. The number of scrubbers employed for effecting the absorption of sulfur from the gas may be varied as conditions require. In some cases it may be found desirable to employ more than two scrubbers, whereas in others a single scrubber will be found sufficient. Because of the basic property of the sodium carbonate solution, other acid constituents of the gas besides carbon dioxid and hydrogen sulfid will be absorbed; for example, the sodium carbonate solution will absorb hydrocyanic acid.

The foul sodium carbonate solution containing the absorbed sulfur passes through a discharge line 5 and, if desired, through a heater to a hot well 6 and from the hot well 6 the foul solution is pumped by means of a pump 7 through another discharge line 8 to the top of a cooling tower 9. Flowing continuously down through the cooling tower 9 the foul solution is subjected to aeration caused by an upward draft of air through the cooling tower, and this aeration is effective to cause the foul solution to give up the hydrogen sulfid and other absorbed constituents and to become thoroughly rejuvenated and purified as it reaches the basin 10 underneath the cooling tower. The regeneration of the foul solution in the cooling tower is illustrated by means of the following equations:

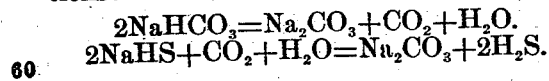

And also:

$$NaHCO_3 + NaHS = Na_2CO_3 + H_2S.$$

Rapid and thorough aeration greatly accelerates the foregoing reactions by rapidly removing the gaseous reaction products, as well as checking the formation of thiosulfate, and the foul solution gives up its hydrogen sulfid and is rejuvenated. The rejuvenation process in the cooling tower may be augmented by increasing the content of carbon dioxid in the air circulated upwardly through the cooling tower. Instead of air, another similarly inert gas may be used.

In order to accelerate the above regenerative reactions, and to increase the rapidity of aeration by causing a strong updraft of air through the cooling tower, a large quantity of the purified solution in the basin 10 may be heated and pumped back to the hot well in which it joins and greatly dilutes the foul solution that is flowing to the top of the cooling tower. From the basin 10 the rejuvenated solution is pumped by means of a pump 11 through a line 12 to heat exchange means such as the battery of primary coolers 13 and in said primary coolers 13 the solution is circulated in counter-current with the hot gas as it issues from the collecting main of a by-product coke oven. Thus the solution absorbs large quantities of heat before flowing through the line 14 to the hot well. The hot solution in the top of the tower promotes an updraft of air through the tower with a resultant increase in the aerating effect and a great efficiency in the rejuvenating process carried on in the cooling tower. From the basin 10 a portion of the rejuvenated solution is pumped by a pump 15 through a fresh solution line 16 to the scrubbers, thereby maintaining a constant recirculation of solution to the gas purification process.

The invention as hereinabove set forth may be variously embodied within the scope of the claims hereinafter made.

Those features of invention in apparatus and process exemplified in the foregoing description which relate more particularly to the heating of the gas purifying solution, and to the employment of heat exchange means, such as the primary coolers, whether singly or in combination, are the invention of another and are made the subject matter of the co-pending application of Charles J. Ramsburg, for Letters Patent of the United States, filed October 7, 1920, Serial No. 415,230.

I claim:

1. In a process of purifying fuel gas, the combination of steps that consists in: continuously passing the gas through an alkaline absorbent agent to absorb the hydrogen-sulfid impurities from the gas, continuously discharging the absorbent agent containing the absorbed impurities and subjecting it to aeration to remove the absorbed impurities, and continuously circulating the rejuvenated absorbent agent back to the gas purification step; substantially as specified.

2. In a process of purifying fuel gas, the combination of steps that consist in: continuously passing the gas through an alkaline absorbent agent to absorb the hydrogen-sulfid impurities from the gas, continuously discharging the absorbent agent containing the absorbed impurities and recirculating it downwardly through a cooling tower, against an updraft of air to remove the absorbed impurities, and continuously circulating the rejuvenated absorbent agent back to the gas purification step; substantially as specified.

3. In a process of purifying fuel gas, the combination of steps that consists in: continuously passing the gas through a solution of sodium carbonate to absorb the hydrogen-sulfid from the gas, continuously discharging the foul sodium carbonate solution and subjecting it to aeration to remove the absorbed hydrogen-sulfid, and continuously circulating the rejuvenated sodium carbonate solution back to the gas purification step; substantially as specified.

4. In a process of purifying fuel gas, the combination of steps that consists in: continuously passing the gas through a sodium carbonate solution to absorb the hydrogen sulfid from the gas, continuously discharging the foul sodium carbonate solution and circulating it downwardly through a cooling tower against an updraft of air to remove the absorbed hydrogen-sulfid, and continuously circulating the rejuvenated sodium carbonate solution back to the gas purification step; substantially as specified.

5. A process of purifying gases which consists in: continuously passing the gas through an alkaline-sodium compound solution to absorb hydrogen-sulfid impurities from the gas, discharging the solution containing the absorbed impurities, and then subjecting it to aeration to remove the absorbed impurities and to effect the rejuvenation of the solution to render it available for further gas purification; substantially as specified.

6. A process of purifying gases which consists in: continuously passing the gas through a solution containing from 2 to 5 percentum of an alkaline-sodium compound solution to absorb hydrogen-sulfid impurities from the gas, discharging the solution containing the absorbed impurities, and then subjecting it to aeration to remove the absorbed impurities to effect the rejuvenation of the solution to render it available for further gas purification; substantially as specified.

7. In a process of purifying fuel gas, the combination of steps that consists in: continuously passing the gas through a solution containing from 2 to 5 percentum of an alkaline absorbent agent to absorb the hydrogen-sulfid from the gas, continuously discharging the absorbent solution containing the absorbed impurities and subjecting it to aeration to remove the absorbed impurities, and continuously circulating the rejuvenated solution back to the gas purification step; substantially as specified.

DAVID L. JACOBSON.